(12) United States Patent
Teshima et al.

(10) Patent No.: US 11,768,507 B2
(45) Date of Patent: Sep. 26, 2023

(54) DRIVING CONTROL MANAGEMENT SYSTEM, DRIVING CONTROL MANAGEMENT METHOD, AND COMPUTER READABLE MEDIUM

(71) Applicants: National University Corporation Tokai National Higher Education and Research System, Nagoya (JP); TOYOTA JIDOSHA KABUSHIKI KAISHA, Toyota (JP)

(72) Inventors: Shigeharu Teshima, Nagoya (JP); Takemi Nohara, Gifu-ken (JP); Hidehiro Kato, Okayama (JP); Haruo Fukuda, Tokyo-to (JP)

(73) Assignees: National University Corporation Tokai National Higher Education and Research System, Nagoya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 17/529,724

(22) Filed: Nov. 18, 2021

(65) Prior Publication Data
US 2022/0163975 A1    May 26, 2022

(30) Foreign Application Priority Data

Nov. 20, 2020    (JP) .................................. 2020-193868

(51) Int. Cl.
*G05D 1/02* (2020.01)
*B60W 60/00* (2020.01)
(Continued)

(52) U.S. Cl.
CPC ........... *G05D 1/0289* (2013.01); *B60W 10/04* (2013.01); *B60W 60/0015* (2020.02); *G05D 1/0238* (2013.01); *G05D 2201/0213* (2013.01)

(58) Field of Classification Search
CPC .............. G05D 1/0289; G05D 1/0238; G05D 2201/0213; B60W 40/04; B60W 60/0015;
(Continued)

(56) References Cited

U.S. PATENT DOCUMENTS

2019/0384299 A1* 12/2019 Maruyama ............... G08G 1/16
2020/0026276 A1*  1/2020 Zhang ..................... G01C 21/32

FOREIGN PATENT DOCUMENTS

JP          2015-72651 A       4/2015

OTHER PUBLICATIONS

Teshima, S. et al., "Arbitration Method and its Field Test of Merging Traffic mixed with Auto-and Man-Driving Vehicles", The 17th ITS Symposium 2019, 1-A-01, 2019.

* cited by examiner

*Primary Examiner* — Rodney A Butler
(74) *Attorney, Agent, or Firm* — Dinsmore & Shohl LLP

(57) ABSTRACT

A method for efficiently manage traveling planning in automated driving is provided. The method includes large-area planning of planning driving control of a vehicle in a predetermined management area including a vehicle traffic environment having a certain size, and small-area planning of planning driving control of the vehicle in a limited area or for a range of a limited period in the management area in a more detailed manner than the planning by the large-area planning, in which in at least one of the large-area planning and the small-area planning, information for determining planning is received from a plurality of traffic participants, and management of a combination of the received information and mediation thereof are performed, and the vehicle travels according to planning determined in each of the large-area planning and the small-area planning.

8 Claims, 10 Drawing Sheets

(51) Int. Cl.
*B60W 40/04* (2006.01)
*B60W 10/04* (2006.01)

(58) Field of Classification Search
CPC ....... B60W 2756/10; B60W 60/00276; B60W 60/0011; G08G 1/0112; G08G 1/0145
See application file for complete search history.

| | OBSTACLE | MOVING OBJECT | POSITION-SHARING/ INTENT-SHARING/ ACTION INSTRUCTION |
|---|---|---|---|
| URGENT (SUB SEC OR SHORTER) | ALL RECOGNIZED ENTITIES | | ×/×/× |
| HIGHLY DYNAMIC (S-SUBS) | PEOPLE, OBJECTS (EXCEPT FOR VEHICLES) | | O/×/× |
| | | PEOPLE, VEHICLES | O/O/× |
| | | PEOPLE, VEHICLES | O/O/O |
| TRANSIENT DYNAMIC (H-M-S) | TEMPORARILY PARKED VEHICLES/ STOP VEHICLES TEMPORARILY OCCUPYING SPACE | | O/×/× [TRANSPORTATION- SERVICE MANAGEMENT] |
| TRANSIENT STATIC (M-W-D-H) | CONSTRUCTION TEMPORARILY-CONSTRUCTED OBJECT PARKED VEHICLES | - | O/O /- [TRANSPORTATION- SERVICE MANAGEMENT] |
| PERMANENT STATIC | STRUCTURE IN FACILITY DETERIORATED ROAD CONDITION | - | O/-/- [FACILITY MANAGEMENT] |

Fig. 4

DRIVING CONTROL MANAGEMENT SYSTEM, DRIVING CONTROL MANAGEMENT METHOD, AND COMPUTER READABLE MEDIUM

CROSS REFERENCE TO RELATED APPLICATIONS

This application is based upon and claims the benefit of priority from Japanese patent application No. 2020-193868, filed on Nov. 20, 2020, the disclosure of which is incorporated herein in its entirety by reference.

BACKGROUND

The present disclosure relates to a system for managing driving control of a vehicle, a driving control management method, and a driving control management program.

In recent years, automated driving systems have been used to automatically drive vehicles. In automated driving of a vehicle using such an automated driving system, it is necessary to enable the vehicle to arrive at the destination while recognizing objects that may interfere with the traveling of the own vehicle, hereinafter referred to as interfering objects, and avoiding the interference by these interfering objects.

Therefore, as a prerequisite for such an automated driving system, the setting of Operation Design Domain, ODD, which is an interfering object in the traveling, i.e., the strength of the constraint condition, becomes an important indicator. In other words, the setting as to which objects or the like should be regarded as interfering objects is important.

Further, there are two types of systems, i.e., an autonomous type in which interfering objects are recognized and collisions with these interfering objects are avoided solely by the own vehicle, and a cooperative type in which the own vehicle cooperates with entities other than the own vehicle. For example, in the case of the cooperative type, it is conceivable to realize an automated driving system with cooperation among the own vehicle, other vehicles (other people), roadside equipment, and information centers that collect, summarize, and distribute information.

Japanese Unexamined Patent Application Publication No. 2015-72651 discloses a technology in such a field. This Patent Literature discloses a management system in which the driving control of a vehicle can be managed by a management server.

SUMMARY

However, in the above-described management system, there is a problem that it does not take the efficiency of management into consideration when it performs cooperative-type automated driving in an environment in which various management entities, that are traffic participants, such as management of vehicles themselves, management of roads, management of navigation systems, transportation systems management and operations, TSMO, providers, and facility management centers are present in a mixed manner. That is, in the system for managing automated driving, it has been desired to effectively detect, recognize, and cope with interfering objects in an environment in which a plurality of traffic participants are present in a mixed manner.

The present disclosure provides, for example, a driving control management system for a vehicle in which traveling planning in automated driving is efficiently managed.

A first exemplary aspect is a driving control management system configured to manage driving control of a plurality of vehicles, including: a large-area planning unit configured to plan driving control of a vehicle in a predetermined management area including a vehicle traffic environment having a certain size; and a small-area planning unit configured to plan driving control of the vehicle in a limited area or for a limited period in the management area in a more detailed manner than the planning performed by the large-area planning unit, in which at least one of the large-area planning unit and the small-area planning unit receives information for determining planning from a plurality of traffic participants, and performs management of a combination of the received information and mediation thereof, and the vehicle travels according to planning determined by each of the large-area planning unit and the small-area planning unit.

Another exemplary aspect is a driving control management method for managing driving control of a plurality of vehicles, including: large-area planning of planning driving control of a vehicle in a predetermined management area including a vehicle traffic environment having a certain size; and small-area planning of planning driving control of the vehicle in a limited area or for a limited period in the management area in a more detailed manner than the planning by the large-area planning, in which in at least one of the large-area planning and the small-area planning, information for determining planning is received from a plurality of traffic participants when planning is performed, and management of a combination of the received information and mediation thereof are performed, and the vehicle travels according to planning determined in each of the large-area planning and the small-area planning.

Another exemplary aspect is a driving control management program for managing driving control of a plurality of vehicles, the driving control management program being adapted to cause a computer to perform processes including: large-area planning of planning driving control of a vehicle in a predetermined management area including a vehicle traffic environment having a certain size; and small-area planning of planning driving control of the vehicle in a limited area or for a limited period in the management area in a more detailed manner than the planning by the large-area planning, in which in at least one of the large-area planning and the small-area planning, information for determining planning is received from a plurality of traffic participants when planning is performed, and management of a combination of the received information and mediation thereof are performed.

In this way, it is possible to efficiently plan driving control of a vehicle for both a large area and a small area.

As a result, it is possible to efficiently manage traveling planning in automated driving.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 shows an example of classification of interfering objects;

DESCRIPTION OF EMBODIMENTS

Figure 1:
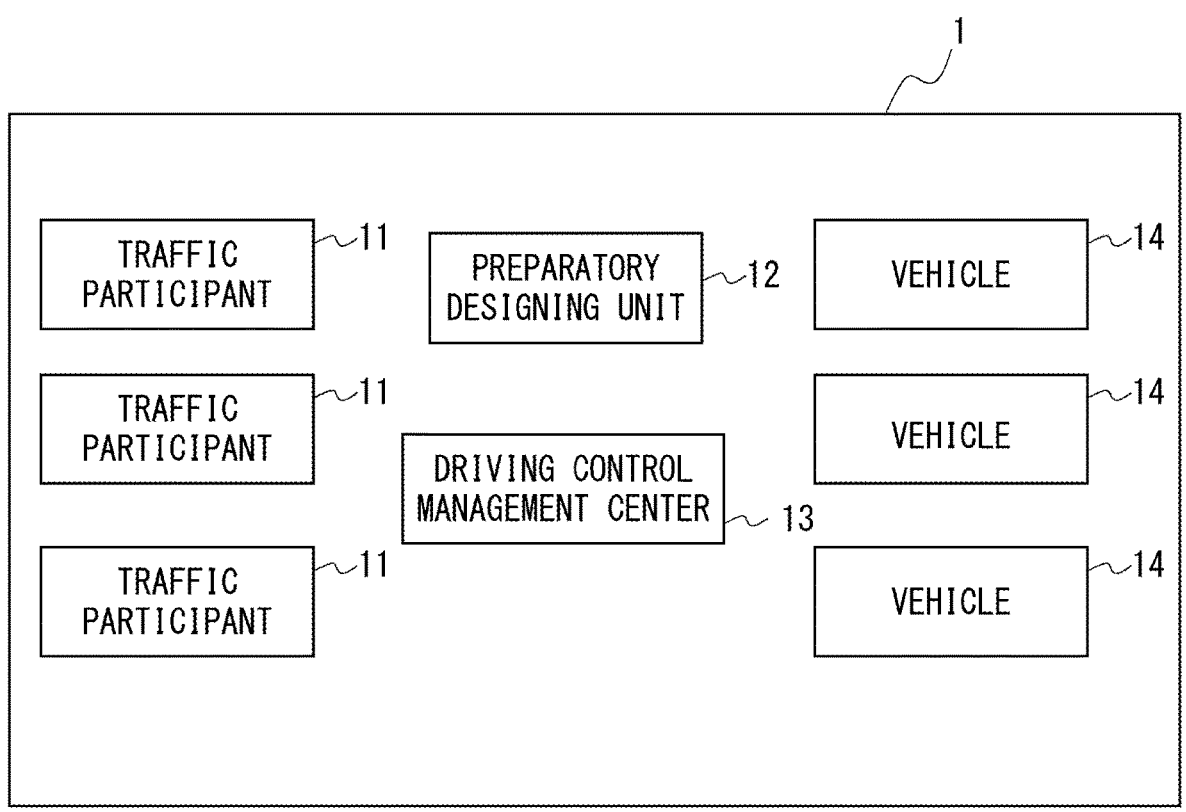
FIG. 1 shows an example of a configuration of a driving control management system.

Embodiments according to the present disclosure are described hereinafter with reference to the drawings. As shown in FIG. 1, a driving control management system 1 may include a traffic participant 11, a pre-trip planning unit, hereinafter referred to "a preparatory designing unit", 12, a driving control management center 13, and a plurality of traveling vehicles, hereinafter referred to simply as "vehicles", 14.

Figure 2:
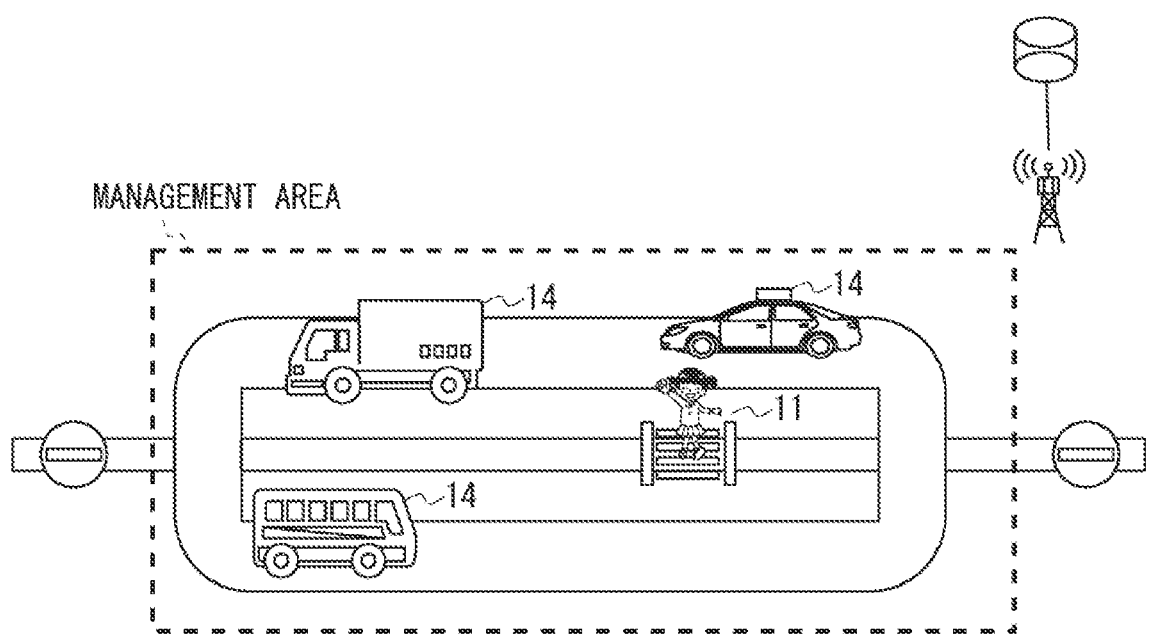
FIG. 2 shows an example of a management area including a vehicle traffic environment.

As shown in FIG. 2, the driving control management system 1 is used in an environment including a vehicle traffic environment having a certain size. It is assumed that the aforementioned environment including the vehicle traffic environment having the certain size is a predetermined management area. Note that a spatially limited area in a large area and a small area (which will be described later), or a period of time in the large area and the small area, i.e., a temporally limited area, can be set as the aforementioned management area. Further, the same applies to a nearby area and a local area (which will be described later) in the small area.

Figure 3:
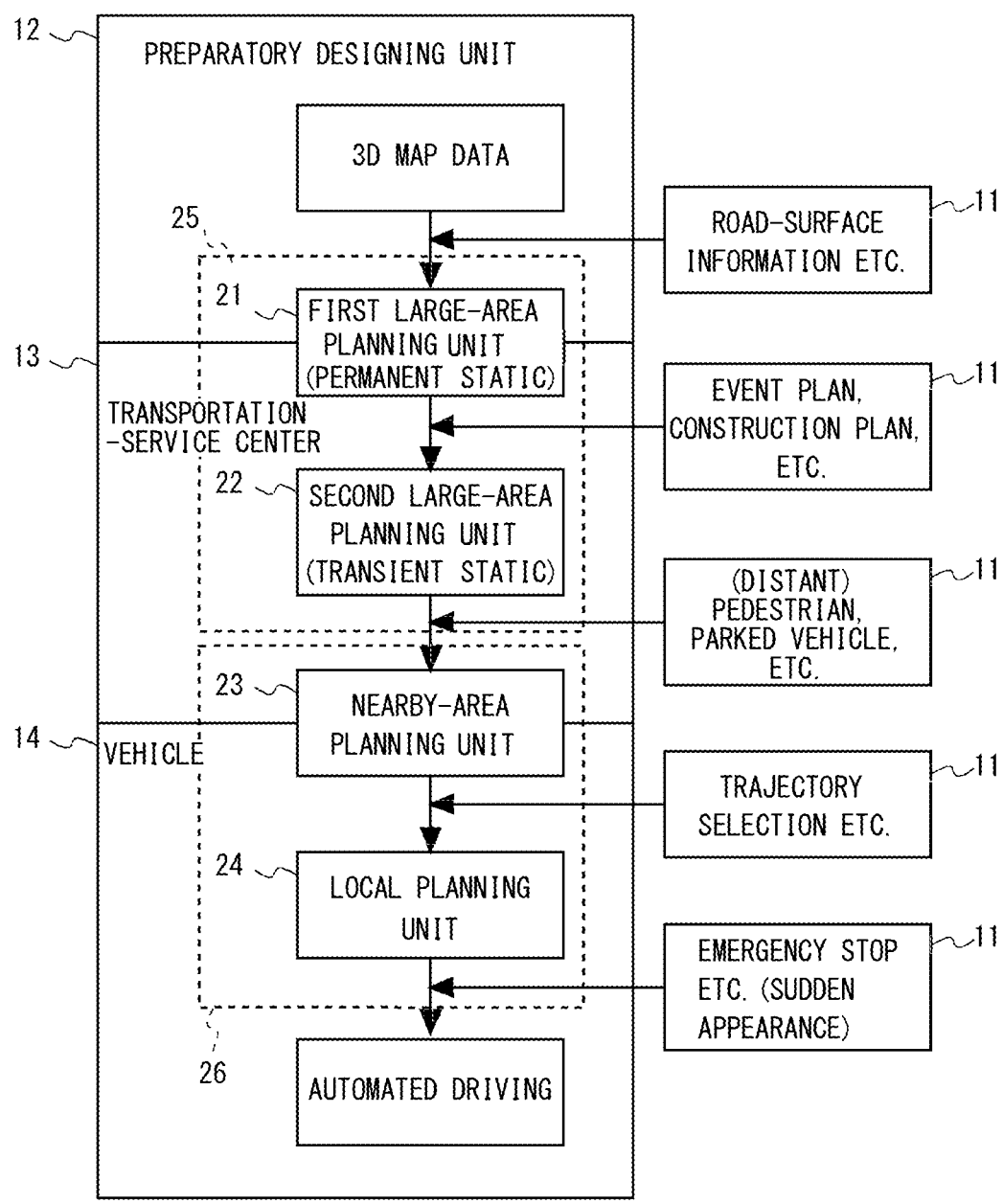
FIG. 3 shows an example of a configuration of a driving control management system and an example of input information.

As shown in FIG. 3, the driving control management system 1 includes first large-area planning unit (large-area planning (permanent static)) 21, second large-area planning unit (large-area planning (transient static)) 22, nearby-area planning unit (nearby-area planning) 23, and local planning unit (local planning) 24.

Note that the first and second large-area planning units 21 and 22 may be collectively regarded as one large-area planning unit 25. Similarly, the nearby-area planning unit 23 and the local planning unit 24 can be collectively regarded as small-area planning unit 26. The traffic participant 11 is a person or a system such as AI (Artificial Intelligence). For example, the traffic participant 11 may be a server of a management company, access from a remote operator, an automated transportation-service system, or a navigation system, or may be other entities. In the following description, it is assumed that a plurality of traffic participants 11 are disposed in the management area.

For example, the traffic participant 11 can selectively output information such as information about a road-surface in the management area, an event plan, a construction plan, information about distant pedestrians, information about parked vehicles, information about a choice of a trajectory along which the vehicle travels, and information about an emergency stop due to a person who suddenly appears in front of the vehicle 14 to the preparatory designing unit 12, the driving control management center 13, and the vehicle 14. In other words, the traffic participant 11 can selectively output information that has been input and stored in advance, newly detected information, and information that is obtained after processing the aforementioned information to the preparatory designing unit 12, the driving control management center 13, and the vehicle 14.

The aforementioned information is used for planning performed by each of the first large-area planning unit 21, the second large-area planning unit 22, the nearby-area planning unit 23, and the local planning unit 24.

Map data is stored in the preparatory designing unit 12. Here, it is assumed that the map data held in the preparatory designing unit 12 is 3D (three-dimensional) map data. In this 3D map data, for example, information about coordinates or the like of objects that do not move and are fixed in the same place for a long period, such as buildings, are stored.

Further, information about an action network of the vehicle 14 is stored in the preparatory designing unit 12. The action network contains information about action points such as a start point, a relay point, and an arrival point, which are actions that the vehicle 14 could perform, and also stores information about a plurality of spatially fixed trajectories that connect these points with one another. The action network will be described later.

The driving control management center 13 plans the traveling of the vehicle 14 by using information stored in the preparatory designing unit 12 and information received from the traffic participant 11. Further, the driving control management center 13 can perform control for the vehicle 14 and mediates between the vehicle 14 and other vehicles. That is, the driving control management center 13 performs the overall management of the vehicle 14 in the management area, interfering objects to the vehicle 14, and other objects and the like installed in the management area.

Specifically, the driving control management center 13 can perform planning by the first large-area planning unit 21 by cooperating with the preparatory designing unit 12 and using the information received from the traffic participant 11. Further, the driving control management center 13 can perform planning by the second large-area planning unit 22 by using the information received from the traffic participant 11. Further, the driving control management center 13 can perform planning by the nearby-area planning unit 23 by cooperating with the vehicle 14 and using the information received from the traffic participant 11.

Further, the driving control management center 13 can provide an instruction to an interfering object present in the management area, operate an object installed therein, such as a traffic signal, that can influence the actions of other vehicles or other people according to what has been planned, and therefore can perform mediation so that the interfering object does not interfere with the vehicle 14.

The vehicle 14 is a cooperative automated driving system-equipped vehicle, which is automatically driving according to planning by each of the planning units 21 to 24 in the management area. Further, the vehicle 14 can perform planning by using the information received from the traffic participant 11.

In order to perform automated driving, that is dynamic driving task, DDT, the vehicle 14 can acquire and estimate the coordinates of the vehicle itself in the management area, and perform operations of a steering wheel, an acceleration, braking, and the like. Further, the vehicle 14 can include a sensor for detecting a sudden appearance of a person or the like in front of the vehicle 14 (an emergency), and can be configured so as to perform an emergency stop based on the result of the detection of this sensor. Note that the vehicle 14 may be configured to automatically operate blinkers and lights. The vehicle 14 may be a vehicle that travels at a speed of about 5 km/h and can steer all wheels, but is not limited such vehicles.

Next, interfering objects that are set in the driving control management system 1 will be described.

FIG. 4 shows an example of classification of permanent static, transient static, transient dynamic, and highly dynamic interfering objects, and urgent interfering objects that should be detected in a shorter time than the highly dynamic interfering objects should. In FIG. 4, in addition to obstacles and moving objects as interfering objects, examples as to whether or not it is possible to perform position-sharing, that is very basic feature of status-sharing, and/or intent-sharing with these interfering objects, and/or to perform agreement-seeking and prescriptive, hereinafter referred to "action instruction", to the interfering objects about their actions.

Note that the position-sharing means whether or not it is possible to share the relative positional relation between the vehicle 14 and interfering objects, and the intent-sharing means whether or not it is possible to share information such as directions in which interfering objects move and directions in which interfering objects intend to move. Further, the action instruction means whether or not it is possible to instruct interfering objects to perform predetermined actions.

The obstacle which is a permanent static interfering object can be a structure in a facility or a deteriorated road condition. That is, it is assumed that it is possible to perform the position-sharing of the permanent static obstacle, but it is impossible to perform the intent-sharing thereof and impossible to perform the action instruction to the permanent static obstacle. Further, it is assumed that, for example, there is no need to acquire (update) information about the permanent static obstacle at regular intervals.

The obstacle which is a transient static interfering object can be an object related to construction, a temporarily-constructed object, or a parked vehicle. That is, it is assumed that it is possible to perform the position-sharing and the intent-sharing of the transient static obstacle, but it is impossible to perform the action instruction to the transient static obstacle. Further, for example, it is assumed that it is necessary to re-acquire information about the transient static obstacle at regular intervals such as on a monthly basis. Alternatively, the timing at which information about the transient static obstacle is re-acquired can be weekly, daily, or hourly.

The obstacle which is a transient dynamic interfering object can be a temporarily-parked vehicle, a stop vehicle, or an object that temporarily occupies a space. That is, it is assumed that it is possible to perform the position-sharing of the transient dynamic obstacle, but it is impossible to perform the intent-sharing thereof and impossible to perform the action instruction to the transient dynamic obstacle. Further, for example, it is assumed that it is necessary to re-acquire information about the transient dynamic obstacle at regular intervals of hours, minutes, or seconds.

Here, it is assumed that all of transient dynamic interfering objects, transient static interfering objects, and permanent static interfering objects are already recognized on the infrastructure side, i.e., in the transportation-service management or the facility management.

The obstacle which is a highly dynamic interfering object can be people and an entity other than vehicles. That is, it is assumed that it is possible to perform the position-sharing of the highly dynamic obstacle, but it is impossible to perform the intent-sharing thereof and impossible to perform the action instruction to the highly dynamic obstacle.

Further, the moving object which is a highly dynamic interfering object can be a person or a vehicle. That is, it is assumed that it is possible to perform the position-sharing of the highly dynamic moving object and the intent-sharing thereof, and it may be possible or impossible to perform the action instruction to the highly dynamic moving object.

Here, it is assumed that, for all highly dynamic interfering objects, it is possible to perform actions including, at least, the position-sharing thereof. That is, there is no highly dynamic interfering object of which it is impossible to perform the position-sharing. Further, among the highly dynamic interfering objects, those of which it is impossible to perform the intent-sharing can be regarded as obstacles, and those of which it is possible to perform the intent-sharing can be regarded as moving objects.

Further, it is assumed that it is necessary to re-acquire information about the highly dynamic obstacle at regular intervals of seconds or sub-seconds.

The obstacles which are urgent interfering objects include all objects to be recognized by the sensor for detecting the sudden appearance, such as those that suddenly appear in front of the vehicle 14. Information about these urgent obstacles is re-acquired at regular intervals of sub-seconds or shorter, so that they are detected. Note that, for urgent interfering objects, it is necessary to urgently stop the vehicle 14 as soon as they are detected, so that it is assumed that it is impossible to perform any of the position-sharing, the intent-sharing, and the action instruction.

As described above, in the driving control management system 1, it is possible to classify obstacles and moving objects, which are interfering objects, into five types, i.e., permanent static, transient static, transient dynamic, highly dynamic, and urgent. Further, in the driving control management system 1, it is possible to use information about permanent static, transient static, transient dynamic, and highly dynamic interfering objects, and thereby to perform planning in accordance with the timing of the re-acquisition of each of the pieces of information by using the respective one of the planning units 21 to 24. In particular, the above-described feature can be interpreted as follows. That is, among the "permanent static, transient static, transient dynamic, highly dynamic, and urgent" interfering objects in a temporally limited area, the large-area planning unit 25 is responsible for the first half of them, and the small-area planning unit 26 is responsible for the second half thereof.

Next, features of planning performed by each of the planning units 21 to 24 will be described. Here, in particular, a relation between planning of each of the planning units 21 to 24 and interfering objects will be described.

Each of the first and second planning units 21 and 22 plans a trajectory for avoiding permanent static and transient static interfering objects before the vehicle starts traveling.

Specifically, the first large-area planning units 21 performs collective planning (first large-area planning) for the entire area in the management area, which is the largest area. Further, the first large-area planning unit 21 performs planning by using information about, among all interfering objects, permanent static interfering objects of which changes are the smallest, such as road-surface markings. Therefore, regarding the first large-area planning unit 21, it is assumed that, when the vehicle is automatically driven, the frequency with which information is re-acquired and planning is performed again is the lowest.

The second large-area planning unit 22 performs planning for interfering objects which correspond to at least either interfering objects the areas affected by which are smaller than those affected by interfering objects used for planning by the first large-area planning unit 21, such as an event plan and a construction plan, or interfering objects of which changes that occur over time are larger than those of the interfering objects used by planning by the first large-area planning unit 21. Here, it is assumed that the interfering objects for which planning is performed by the second large-area planning unit 22 are those that satisfy both of the above-described conditions.

That is, the second large-area planning unit 22 performs planning for, among all interfering objects, those of which changes are the second smallest after those used by the first large-area planning unit 21 in the second largest area after the area for the first large-area planning unit 21. In other words, the second large-area planning unit 22 performs planning in an area smaller than that for the planning by the first large-area planning unit 21 in a more detailed manner than the planning by the first large-area planning unit 21 (i.e., performs second large-area planning).

Therefore, regarding the second large-area planning unit 22, when the vehicle is automatically driven, the frequency with which information is re-acquired and planning is performed again is higher than that for the first large-area planning unit 21.

Note that, as shown in FIG. 3, the planning by the second large-area planning unit 22 is performed after the planning by the first large-area planning unit 21.

The nearby-area planning unit 23 performs planning so as to avoid collisions with transient dynamic interfering objects. Here, it is assumed the planning performed by the nearby-area planning unit 23 is performed for a trajectory to a distant place that may possibly affect the action of the vehicle, such as a distant pedestrian and a distant parked vehicle.

That is, the nearby-area planning unit 23 performs planning for interfering objects which correspond to at least either interfering objects the areas affected by which are smaller than the transient static interfering objects used by the second large-area planning unit 22, or interfering objects of which changes that occur over time are larger than those of the interfering objects used by the second large-area planning unit 22. Here, it is assumed that the interfering objects for which planning is performed by the nearby-area planning unit 23 are those that satisfy both of the above-described conditions.

In other words, the nearby-area planning unit 23 performs planning in an area smaller than that for the planning by the second large-area planning unit 22 in a more detailed manner than the planning by the second large-area planning unit 22 (i.e., performs nearby-area planning).

Note that the nearby-area planning unit 23 performs planning by using information about, among all interfering objects, transient dynamic interfering objects of which changes are larger than those of the interfering objects used by the second large-area planning unit 22. Therefore, regarding the nearby-area planning unit 23, when the vehicle is automatically driven, the frequency with which information is re-acquired and planning is performed again is higher than that for the second large-area planning unit 22.

Note that, as shown in FIG. 3, the planning by the nearby-area planning unit 23 is performed after the planning by the second large-area planning unit 22.

The local planning unit 24 calculates a trajectory that the vehicle should follow while taking the avoidance of collisions with highly dynamic interfering objects into consideration.

The local planning unit 24 performs planning for interfering objects which correspond to at least either interfering objects the areas affected by which are smaller than transient dynamic interfering objects used by the nearby-area planning unit 23, such as a person, a moving object, and a moving vehicle, or interfering objects of which changes that occur over time are larger than those of the interfering objects used by the nearby-area planning unit 23. Here, it is assumed that the interfering objects for which planning is performed by the local planning unit 24 are those that satisfy both of the above-described conditions.

In other words, the local planning unit 24 performs planning in an area smaller than that for the planning by the nearby-area planning unit 23 in a more detailed manner than the planning by the nearby-area planning unit 23 (i.e., performs local planning).

Further, the local planning unit 24 performs planning by using information about, among all interfering objects, highly dynamic interfering objects of which changes are larger than those of the interfering objects used by the nearby-area planning unit 23. Therefore, regarding the local planning unit 24, when the vehicle is automatically driven, the frequency with which information is re-acquired and planning is performed again is higher than that for the nearby-area planning unit 23.

Note that, as shown in FIG. 3, the planning by the local planning unit 24 is performed after the planning by the nearby-area planning unit 23.

Further, it can be considered that, for example, planning performed by any of the first large-area planning unit 21, the second large-area planning unit 22, and the nearby-area planning unit 23 can be performed while regarding it as common planning with other vehicles 14, whereas planning by the local planning unit 24 is planning only for its own vehicle 14. In other words, planning by the local planning unit 24 is in a different state for each vehicle 14.

As described above, each of the planning units 21 to 24 can plan driving control for a management area that is limited in regard to at least one of the space and the time. Further, each of the planning units 21 to 24 can perform planning by integrating and managing information received from each of a plurality of traffic participants 11 when the planning units sets its planning.

Next, the output of each of the planning units 21 to 24 that is output when the planning unit performs planning will be described.

In each planning, a result of calculation or processing is output in the form of a time-space-fixed trajectory, a space-fixed trajectory, or an action network according to the granularity of calculation target of the planning.

The time-space-fixed trajectory is in a form in which spatial coordinate values and passing times are specified in all trajectories constituting the trajectory along which the vehicle 14 travels. That is, the time-space-fixed trajectory is data that is the target of the trajectory tracking in the vehicle.

The space-fixed trajectory is in a form in which temporal components do not have to be specified or can be specified in a range in the trajectory along which the vehicle 14 travels.

Figure 5:
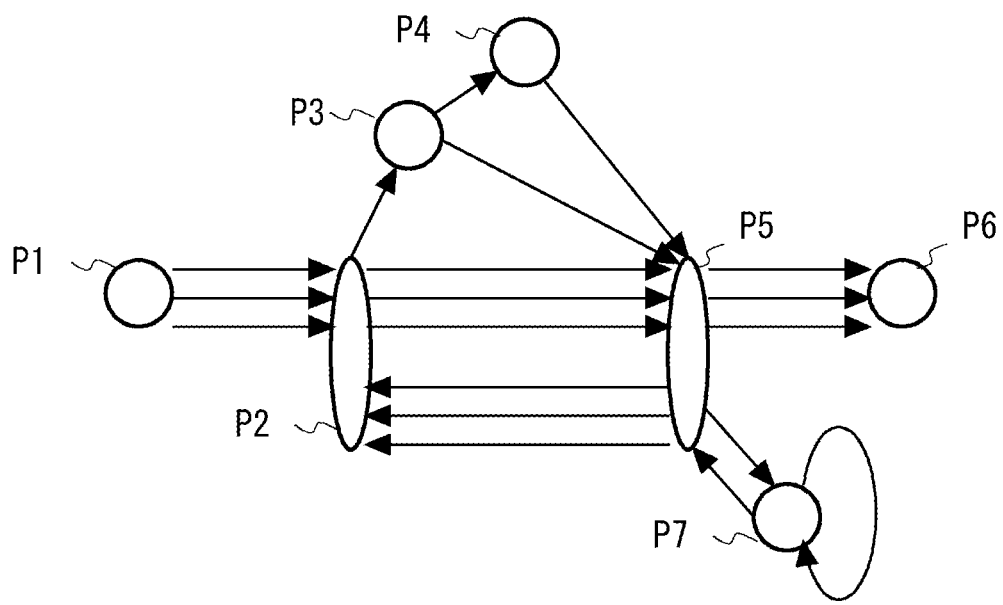
FIG. 5 shows an example of an action network.

As shown in FIG. 5, the action network is a group of space-fixed trajectories along which the vehicle 14 can travel when it moves between action points while using, as the action points, points within a certain range in the management area where the vehicle 14, for example, changes its route, starts automated driving, completes automated driving, changes an automated driving control mode (e.g., switches the calculation method for following the trajectory, accelerating/decelerating, or steering), stops temporarily, restarts, or travels through.

Next, details of planning using such an action network will be described.

Firstly, planning by the first and second large-area planning units 21 and 22 will be described.

The first large-area planning unit 21 designs an action network from data of permanent static interfering objects (mainly 3D map data) when it sets interfering objects.

Further, the second large-area planning unit 22 adds, in the action network, an attribute for selectively invalidates a space-fixed trajectory that interferes with a transient static interfering object.

Figure 6:
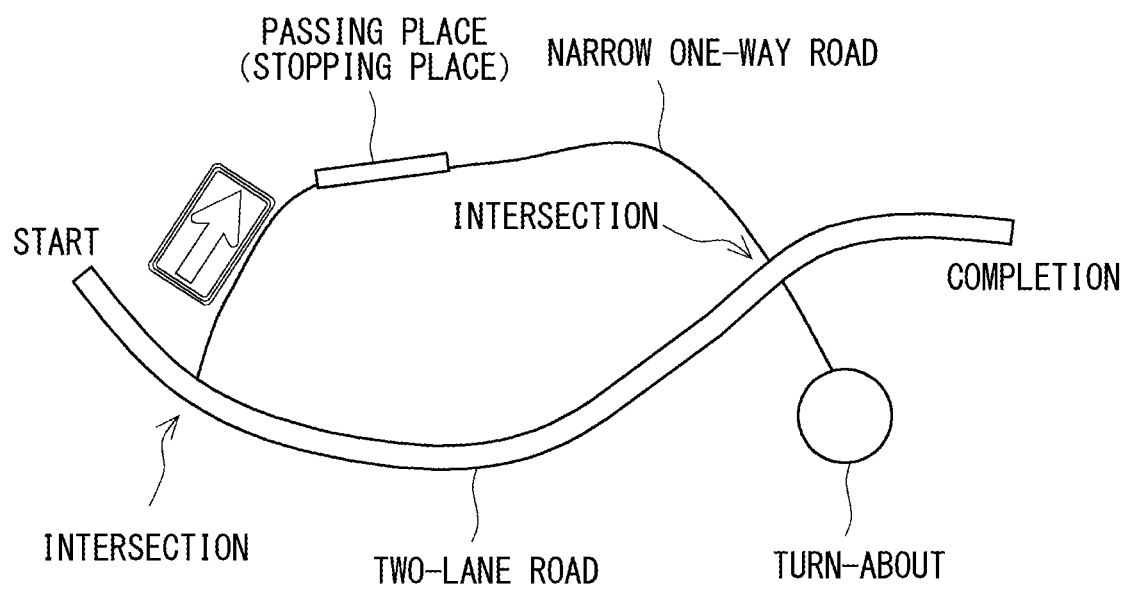
FIG. 6 shows an example of an area where a vehicle can travel.

An example of a specific operation will be described hereinafter with reference to FIG. 5. Note that FIG. 6 shows an example of an area where the vehicle can travel in an area where the action network shown in FIG. 5 is created, and each of FIGS. 7 to 9 shows a state in which a trajectory along which the vehicle 14 can travel is set on a map.

Figure 7:
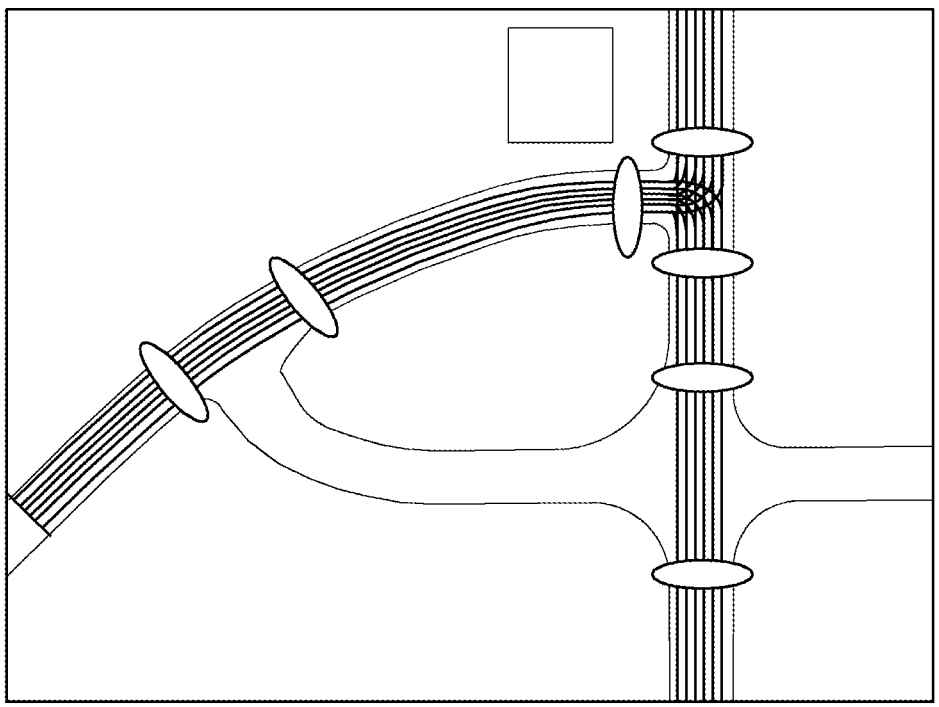
FIG. 7 shows an example of a trajectories set on a road.
Figure 8:
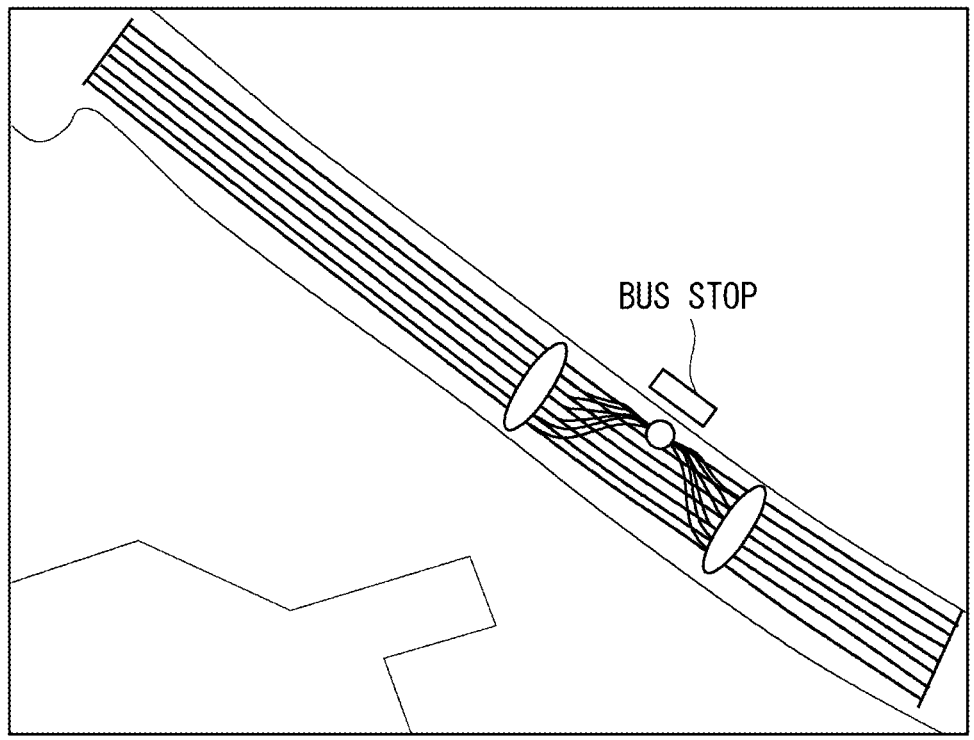
FIG. 8 shows an example of a trajectories set on a road.
Figure 9:
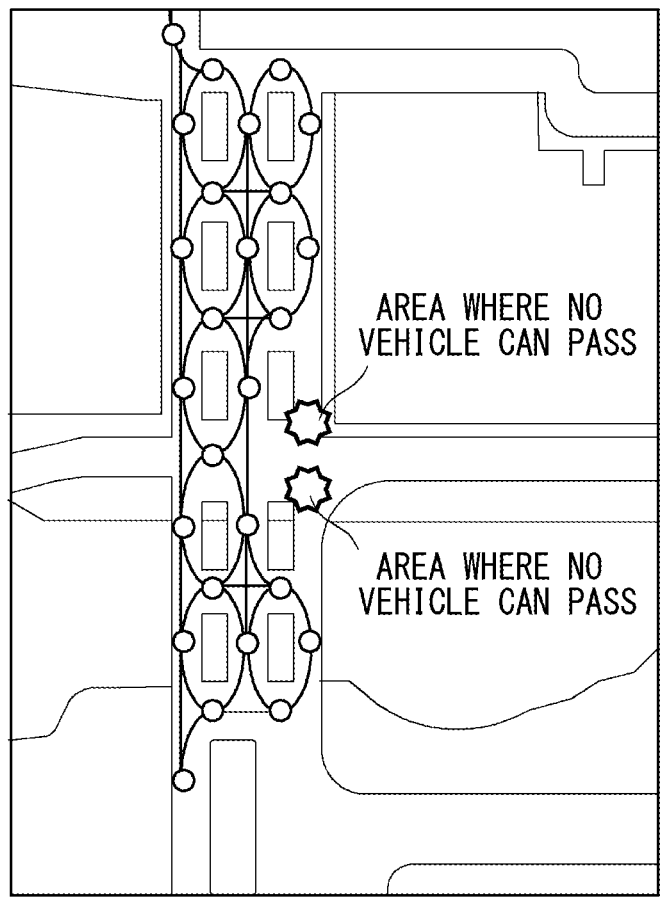
FIG. 9 shows an example of a trajectories set on a road.

Note that FIG. 7 shows an example in which left-side, slightly left-side, center, slightly right-side, and right-side trajectories are set as trajectories on the road, and FIG. 8 shows an example in which all trajectories are curved toward a bus stop due to the presence of the bus stop. Further, FIG. 9 shows an example in which due to the presence of an area where the vehicle cannot travel (impassable), no trajectory is set in or near that area.

As shown in FIG. 5, the first large-area planning unit 21 sets seven action points as the action network, and one to three space-fixed trajectories between action points are set in each direction. Note that, for example, between first and second action points P1 and P2, information about three trajectories, i.e., right-side, center, and left-side trajectories in the lane are stored in the action network. Note that these three trajectories are set in such a manner that, in the left-right direction in the vehicle traveling along the trajectory, the interval between the right-side and center trajectories is about 50 cm, and the interval between the center and left-side trajectories is about 50 cm.

For example, when vehicle 14 moves from the action point P1 to the point P2 and there is a vehicle parked on the left side of the road, it is possible to make such a setting that, among all the trajectories, the left-side trajectory cannot be used.

For the action network in which the space-fixed trajectories are set by the first large-area planning unit 21 as described above, the second large-area planning unit 22 adds information indicating that a trajectory that cannot be used due to a transient static interfering object is unavailable and hence the trajectory is invalidated.

In particular, this information is stored before the vehicle 14 begins to travel along the invalidated space-fixed trajectory, and can be used when trajectories that should be left as candidates are selected from all the trajectories, and/or when a trajectory that will be actually used is selected from the remaining candidate trajectories.

Note that, similarly, information can be added in the action network so that at an action point P4 in FIG. 5, which corresponds to the stop point in FIG. 6, the vehicle 14 performs a stopping action, and at an action point P7 in FIG. 5, which corresponds to the change of direction in FIG. 6, the vehicle 14 performs a turning action.

Note that, in the second large-area planning unit 22, the traffic participant 11 inputs (i.e., supplies) information about the effects of transient static interfering objects. In the large-area planning unit 25, it can be considered that it is possible to regard the 3D map data input in the first large-area planning unit 21 as input from another traffic participant 11, and it is possible to perform management of a combination of pieces of information input from a plurality of traffic participants 11 and mediation thereof.

Next, nearby-area planning by the nearby-area planning unit 23 will be described.

In the nearby-area planning unit 23, candidates for space-fixed trajectories though which the vehicle can avoid interfering objects are generated by collecting and summarizing the positions and the intentions of the interfering objects. Note that this creation of candidates can include constraints on the temporal component, such as setting of a time of arrival to a predetermined action point.

Further, the nearby-area planning unit 23 can mediate actions between the vehicle 14 and an interfering object so as to avoid actual interference between the vehicle 14 and the interfering object by using the intention of the other moving object.

More specifically, the nearby-area planning unit 23 performs planning by selecting a recommended trajectory from an action point which is the current position of the vehicle 14 to an action point which is several points ahead of the current position thereof.

This planning can be performed by collecting and summarizing information about road conditions and the like input from a plurality of traffic participants 11, and through combination management and mediation. For example, transient static information or information from sensors installed on the road can be used as information about the road conditions which is used for the above-described planning.

Therefore, the nearby-area planning unit 23 can perform planning by receiving information about construction, temporarily-constructed objects, and parked vehicles input by traffic participants 11, receiving information from sensors installed on the road as traffic participants 11, and performing combination management and mediation for each of information about the vehicle 14 itself and information from a monitoring staff and a guiding staff used as traffic participants 11.

In this way, in the nearby-area planning unit 23, it is possible to set a recommended trajectory along which the vehicle 14 is made to travel for a limited area set by the nearby-area planning. The recommended trajectory set by this method can be updated at regular intervals, for example, at intervals of about one second.

Next, local planning by the local planning unit 24, which is performed in the vehicle 14, will be described. In the local planning, the trajectory is finalized by incorporating temporal components thereinto.

Specifically, the vehicle 14 generates a trajectory having all the parameters, which is eventually used as the target to which the vehicle follows, by taking the state of the vehicle into consideration. In the local planning performed in the local planning unit 24, the trajectory is finalized while constantly being updated up to three action points ahead. Note that, in the vehicle 14, calculation for the local planning can be performed by hardware installed therein.

Further, in the local planning unit 24, a trajectory to which the vehicle follows is selected from among candidates presented by the nearby-area planning unit 23, and final planning is performed in which temporal components are adjusted by deceleration or a stop due to the detection of an obstacle in the traveling direction from the vehicle 14, and adjustment of the tracking performance of acceleration/deceleration of the own vehicle.

Further, in the local planning unit 24, when the nearby-area planning by the nearby-area planning unit 23 is changed, for example, when a trajectory in the same route is selected again, it is possible to perform planning over a plurality of trajectories.

The trajectory determined by this method can be updated at regular intervals, for example, at intervals shorter than 1 second.

As described above, in the local planning unit 24, it is possible to determine a trajectory along which the vehicle 14 actually travels by using a trajectory which has been narrowed down by the nearby-area planning unit 23 based on the input from traffic participants 11, and by performing combination management and mediation with information input from other traffic participants 11.

Therefore, it is possible to first perform planning in a large area covering the entire management area and then to proceed with the planning (i.e., improve the planning) by gradually narrowing the area. That is, for all the trajectories of the action network set by the large-area planning, it is possible to narrow down candidate trajectories by nearby-area planning, and then to finalize the trajectory from among the trajectories which have been narrowed down by the local planning. Therefore, it is possible to efficiently perform planning of driving control from a large area to a small area.

Further, regarding the sharing of roles, which had been divided among traffic participants 11, it is possible to integrate and set them for each of a range for first large-area planning, a range for second large-area planning, a range for nearby-area planning, and a range for local planning. Therefore, it is possible to efficiently manage traveling planning in automated driving.

Note that the above description has been given on the assumption that each of the large-area planning unit 25 and the small-area planning unit 26 performs integration, management, and mediation. However, at least one of the large-area planning unit 25 and the small-area planning unit 26 may receive information for determining planning from a plurality of traffic participants 11 and perform combination management of the received information and mediation thereof.

Further, the above-described automated driving can include, in addition to the fully-automated driving, automated driving in which part of the driving control is performed by a driver. For example, a function of assisting the vehicle to stay in the lane can be implemented in a large area, and control of braking and steering for avoiding obstacles can be implemented in a small area.

Note that the present disclosure is not limited to the above-described embodiments, and can be changed as appropriate without departing from the scope and spirit of the present disclosure. That is, the above description has been partially omitted and simplified as appropriate for clarifying the explanation, and those skilled in the art can easily change, add, or convert each element in the embodiments within the scope of the present disclosure.

For example, the above description has been made on the assumption that, in each planning, mediation is performed when interference by an interfering object is likely to occur, so that a collision between the vehicle and the interfering object is avoided. However, the present disclosure is not limited to this example. For example, as a result of combination management of pieces of information input from traffic participants 11, the planning may not be changed on the vehicle 14 side under the expectation that the interfering object will perform an action for avoiding the vehicle 14. Alternatively, planning may be performed so that the vehicle 14 is stopped and made to wait for the interfering object to pass therethrough, so that the vehicle 14 does not affect the interfering object.

Figure 10:
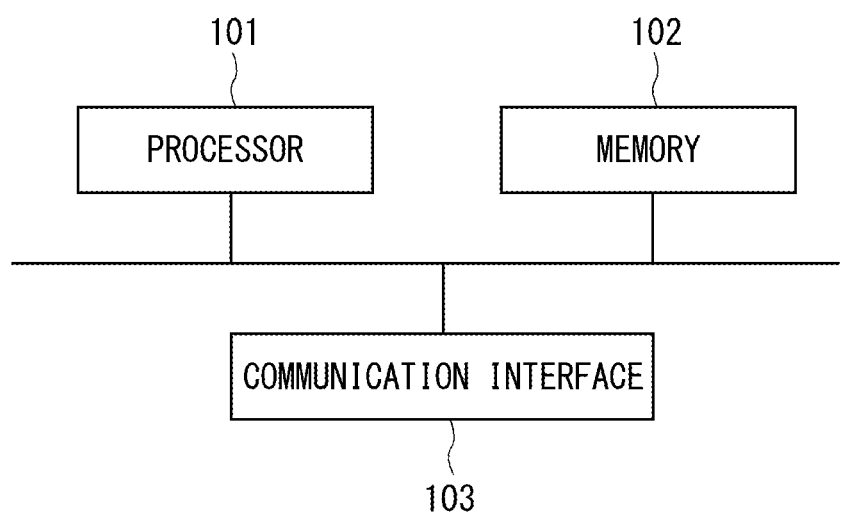
FIG. 10 shows a computer in a driving control management center.

Further, the driving control management system 1 according to the above-mentioned embodiment is not limited to those shown as example in FIGS. 1 and 2. That is, the driving control management system 1 may have any configuration as long as it can perform the above-described functions. For example, each of the driving control management center 13 and the preparatory designing unit 12 can be formed by a single apparatus, or formed by a plurality of apparatuses over which its internal functions distributed. For example, the driving control management system according to the above-mentioned embodiment can have the following hardware configuration for each of the articles constituting the driving control management system. FIG. 10 shows an example of a hardware configuration used in the driving control management center 13.

The driving control management center 13 can include a processor 101, a memory 102, and a communication interface 103. Note that each of the preparatory designing unit 12 and in the vehicle 14 may have a similar configuration. The processor 101 may be, for example, a microprocessor, an MPU (Micro Processor Unit), or a CPU. The processor 101 may include a plurality of processors. The memory 102 may be formed by, for example, a combination of a volatile memory and a non-volatile memory. The functions in the driving control management system 1 described in the embodiment are implemented by having the processor 101 load and execute a control program(s) stored in the memory 102. When doing so, input and output of information can be performed through the communication interface 103.

The aforementioned control program can be a control program for operating the articles constituting the driving control management system 1 described in the embodiment, and is a program for causing a computer to perform the process for planning a trajectory along which a vehicle travels. This process can include steps for each of the above-described first large-area planning, the second large-area planning, the nearby-area planning, and the local planning. Note that each of the aforementioned steps is a step performed by the aforementioned computer. Examples of other applications are as described above and their descriptions are omitted.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A driving control management method for managing driving control of a plurality of vehicles, comprising:
   large-area planning of planning driving control of a vehicle in a predetermined management area including a vehicle traffic environment having a certain size; and
   small-area planning of planning driving control of the vehicle in a limited area or for a limited period in the management area in a more detailed manner than the planning by the large-area planning, wherein
   in at least one of the large-area planning and the small-area planning, information for determining planning is received from a plurality of traffic participants when planning is performed, and management of a combination of the received information and mediation thereof are performed, and
   the vehicle travels according to planning determined in each of the large-area planning and the small-area planning.

2. The driving control management method according to claim 1, wherein in each of the large-area planning and the small-area planning, information for determining planning is received from the plurality of traffic participants, and management of a combination of the received information and mediation thereof are performed.

3. The driving control management method according to claim 1, wherein when information is received from the plurality of traffic participants, and planning is performed in each of the large-area planning and the small-area planning, planning in the small-area planning is performed after planning in the large-area planning is performed.

4. The driving control management method according to claim 1, wherein the small-area planning is at least one of nearby-area planning and local planning,
   the nearby-area planning being planning in which when driving control of the vehicle is planned in a limited area or for a limited period in the management area in a more detailed manner than the planning in the large-area planning, the driving control is planned by restricting a trajectory along which the vehicle travels, and
   the local planning being planning in which when the driving control of the vehicle is planned in a limited area or for a limited period in the management area in a more detailed manner than the planning in the large-area planning unit, the driving control is planned by restricting an action of the vehicle so as to prevent a collision of the vehicle.

5. The driving control management method according to claim 4, wherein when planning in the nearby-area planning and planning in the local planning are performed, the planning in the nearby-area planning is performed after the planning in the large-area planning, and the planning in the local planning is performed after the planning in the nearby-area planning.

6. The driving control management method according to claim 4, wherein when planning is performed in the nearby-area planning, information that is received from the traffic participant and used for the planning is information for an area larger than that of information that is used when planning is performed in the local planning.

7. The driving control management method according to claim 4, wherein
   when planning is performed in the large-area planning, information that is received from the traffic participant and used for the planning is information for a period longer than that of information that is used when planning is performed in the small-area planning, and
   when planning is performed in the nearby-area planning, information that is received from the traffic participant and used for the planning is information for a period longer than that of information that is used when planning is performed in the local planning.

8. The driving control management method according to claim 4, further comprising:
   a driving control management center performs planning in the large-area planning, the driving control management center being configured to transmit and receive information to and from at least the plurality of vehicles;
   at least one of the driving control management center and the vehicle performs planning in the nearby-area planning; and
   the vehicle performs planning in the local planning.

* * * * *